United States Patent [19]

Carlson et al.

[11] 4,133,898

[45] Jan. 9, 1979

[54] PROCESS FOR PREPARING QUICK-COOKING RICE

[75] Inventors: Robert A. Carlson, El Cerrito; Robert L. Roberts, Moraga; Daniel F. Farkas, Piedmont, all of Calif.

[73] Assignee: The United States of America as represented by the Secretary of Agriculture, Washington, D.C.

[21] Appl. No.: 762,899

[22] Filed: Jan. 26, 1977

[51] Int. Cl.² ........................... A23L 1/10; A23L 1/20
[52] U.S. Cl. ........................................ 426/462; 34/8; 34/10; 34/12; 34/25; 34/31; 34/34; 426/465; 426/467; 426/506; 426/509
[58] Field of Search .............. 426/618, 627, 455, 456, 426/459, 462, 465, 467, 506, 509, 520, 523; 34/8, 10, 12, 13, 17, 22, 25, 30, 31, 33, 34, 57 E, 58, 60

[56] References Cited

U.S. PATENT DOCUMENTS

| | | | |
|---|---|---|---|
| 2,610,124 | 9/1952 | Roberts et al. | 426/462 X |
| 2,828,209 | 3/1958 | Hollis et al. | 426/462 X |
| 2,992,921 | 7/1961 | Bardet et al. | 426/465 |
| 3,164,475 | 1/1965 | Willock | 426/462 |
| 3,189,462 | 6/1965 | Autrey et al. | 426/462 |
| 3,500,552 | 3/1970 | Farkas et al. | 34/8 |
| 3,694,226 | 9/1972 | Howland et al. | 426/462 |
| 4,035,925 | 7/1977 | Brown et al. | 34/8 |

FOREIGN PATENT DOCUMENTS 715025   8/1965   Canada ..................................... 426/462

Primary Examiner—Arthur L. Corbin
Attorney, Agent, or Firm—M. Howard Silverstein; David G. McConnell; Theodore J. Leitereg

[57] ABSTRACT

Quick-cooking white, brown, and wild rices are prepared by a process wherein the rice is soaked in water, cooked, and dried in a centrifugal fluidized bed drier while being tumbled at at least two different centrifugal forces.

5 Claims, No Drawings

PROCESS FOR PREPARING QUICK-COOKING RICE

BACKGROUND OF THE INVENTION

1. Field of the Invention

This invention relates to and has among its objects the provision of novel processes for preparing quick-cooking rice products. Further objects of the invention will be evident from the following description wherein parts and percentages are based on weight unless otherwise specified.

2. Description of the Prior Art

Methods are known for preparing quick-cooking rice products. Usually, the known methods involve a combination of certain pre-drying steps such as fissuring, soaking, steaming, or boiling the rice. The pre-treated rice is then dried to a specific moisture content and is ready to be quick-cooked.

One problem with all of the known processes is that they have been applied successfully only to long grain white rice varieties; short and medium grain white rice, brown rice, and wild rice varieties have not been prepared for quick-cooking by the prior art methods. The short and medium grain white rice varieties exhibit surface-stickiness and individual grains tend to clump together yielding a texturally inferior product. Attempts at producing quick-cooking wild rice varieties have been unsuccessful because the resulting product when rehydrated by cooking is brittle and not totally cooked. Furthermore, the individual grains of wild rice break apart when subjected to the quick-cooking processes of the prior art.

SUMMARY OF THE INVENTION

The invention described herein provides means for obviating the above problems. In accordance with the invention white rice (long, medium, and short grain), brown rice, and wild rice varieties can be rendered quick-cooking. In the case of white rice varieties, the following steps are employed: (a) the rice is first soaked at ambient temperature for a period of 1 hour; (b) the soaked rice is cooked at 100° C. for about 4 to 8 minutes; and (c) the hot rice is dried in a centrifugal fluidized bed drier at a temperature of 140–150° C. and an air velocity of 610–915 meters per minute; the rice is tumbled at a peripheral speed of 20–30 meters per minute for a period of about 1 to 2 minutes and then is subjected to a centrifugal force of about 2 to 30 × g for a period of 3 to 6 minutes. The total drying time is usually about 4 to 7 minutes.

To prepare quick-cooking brown rice according to the method of the invention one employs the steps of: (a) soaking the rice at ambient temperature for a period of one hour; (b) cooking the soaked rice at 100° C. for a period of 20 to 40 minutes; and (c) drying the cooked rice in a centrifugal fluidized bed drier at a temperature of 140–150° C. and an air velocity of 610–915 meters per minute; the rice is first tumbled at a peripheral speed of 20–30 meters per minute for a period of about 1 to 2 minutes and then is subjected to a centrifugal force of about 10 to 15 × g for a period of 2 to 3 minutes. The total drying time is thus about 3 to 5 minutes.

For preparation of quick-cooking wild rice the following procedure is applied: (a) wild rice is cooked for 25–45 minutes at 100° C., and (b) the hot rice is dried in a centrifugal fluidized bed drier at a temperature of 135°–145° C. and an air velocity of 600–700 meters per minute. Three increasing centrifugal forces are used for varying periods: 1 to 2 minutes at approximately 10 × g, 1 to 2 minutes at approximately 13.6 × g, and 1 to 2 minutes at approximately 17.5 × g for a total drying time of about 3 to 6 minutes.

One advantage of the invention is that quick-cooking medium and short grain rice varieties can be prepared. The problem of surface-stickiness of these products, which ordinarily renders them difficult or impossible to prepare for quick-cooking, is overcome by the process of the invention.

Another advantage of the invention is that it can be applied to the production of quick-cooking wild rice. Heretofore, quick-cooking wild rice has not been available because all of the known techniques for preparing quick-cooking long grain rice could not be applied to wild rice. When the prior art methods were employed, excessive breaking loss occurred due to the fragile nature of wild rice. In addition, the texture, flavor, and appearance of the final product was poor. When the process of the invention is applied to wild rice, an excellent product which can be cooked in about 15 minutes, is obtained. The so-prepared wild rice has excellent tenderness, flavor, and appearance.

Another advantage of the invention is that fewer operational steps are required to achieve a better end product than are required in the prior art processes. A steaming or fissuring or freezing step, common in other methods, is not necessary in the practice of the instant invention.

A further advantage of the invention is that the precooked rice is dried at lower temperatures and for shorter times than in the known procedures. Thus, substantial energy savings are realized.

Another advantage of the invention is that the rehydration qualities of the quick-cooking product can be controlled. The porosity of the rice grains treated in accordance with the invention is uniform thus allowing facile rehydration without over-gelatinization of the final cooked material. Furthermore, the integrity and size of the grains are maintained in the final cooked product thus assuring excellent texture.

Another related advantage of the invention is that the bulk density of the final product can be accurately controlled. Density is related to the porosity of the product; the greater the porosity, the lower the bulk density.

DESCRIPTION OF THE PREFERRED EMBODIMENTS

The invention provides processes by which white and wild rice can be rendered quick-cooking. The so-prepared product upon rehydrating will assume the desired texture, flavor, and appearance associated with products prepared by traditional household recipes but without lengthy cooking procedures.

Quick-cooking white rice (long, medium, or short grain) is prepared by a process involving the following steps:

(a) The rice is soaked at ambient temperature for a period of one hour to raise its moisture content to about 30–40%. Generally, about 2 to 3 parts of water per part of rice are used.

(b) Following the soaking period, the rice is cooked in boiling (temperature about 100° C.) water (about 2 to 3 parts per part of rice) for a period of 4 to 8 minutes. During the cooking period, the moisture level of the rice is raised to 55–70%, the rice becomes gelatinized, and its cellular structure is expanded.

The duration of the cooking period varies with the grain size; long grain white rice requires a longer cooking period, e.g., 6–8 minutes, to render it quick-cooking whereas the short grain varieties require less cooking time, e.g., 4–6 minutes.

It should be noted also that the rehydration qualities and texture of the final product are controlled by the length of the above cooking period. Denser rice can be prepared by employing shorter cooking times. Generally, the bulk density of the quick-cooking rice of the invention is about 0.38–0.45 grams per cubic centimeter. The proper conditions for the cooking step to produce the desired texture, density, etc., can be determined by pilot trials.

(c) The cooked rice while still hot is dried in a centrifugal fluidized bed drier to a moisture content of about 3 to 10%. The centrifugal fluidized bed (CFB) drier is described in U.S. Pat. No. 3,500,552 and U.S. Pat. No. 4,035,925. The CFB drier consists of a rotating basket of open-mesh screen in which a bed of the material to be dried is formed. In U.S. Pat. No. 4,035,925 a unidirectional flow of hot air is blown through the bed of the material perpendicular to the axis of rotation of the basket; and the centrifugal force of the rotating basket is adjusted to resist the lifting action of the air stream. As a result the bed of material becomes fluidized.

In drying rice in accordance with the invention the rice as prepared above is placed in the CFB drier. Hot air at a temperature of about 140°–150° C. is blown through the rice at a velocity of about 610–915 meters per minute. For the initial 1 to 2 minutes the rice is tumbled at a peripheral basket speed of 20 to 30 meters per minute (40 to 60 rpm, 0.15 to 0.30 $\times$ $g$). Afterwards, the centrifugal force is increased to about from 2 to 30 $\times$ $g$ for a period of 3 to 6 minutes. The total drying time is ordinarily about 4 to 7 minutes.

If the cooked rice is not dried immediately after cooking it must be treated with water at ambient temperature for a period of about 1 to 2 minutes. As a result further cooking of the rice is prevented thus assuring that the rice will have the proper moisture content when it is subsequently dried. The so-dried white rice can be held at ambient temperature until it is to be consumed. Rehydration and cooking of the so-prepared rice can be accomplished by treating the rice with boiling water (100° C.) and allowing the rice to stand for a period of 10 minutes or until the rice is tender. Generally, about 2.5 parts of water are used per part of rice.

Quick-cooking brown rice is prepared in a manner similar to that described above for white rice.

(a) Brown rice is soaked in approximately 2 to 3 parts of water per part of rice at ambient temperature for a period of one hour to raise its moisture content to 30–40%.

(b) The soaked brown rice is cooked in water at about 100° C. for a period of 20 to 40 minutes. Usually about 2 to 4 parts of water per part of rice are employed.

(c) The hot rice is dried immediately in a CFB drier to a moisture content of 8–10% at a temperature of about 140°–150° C. and an air velocity of 610 to 915 meters per minute. The rice is first tumbled at a peripheral speed of 20 to 30 meters per minute (40 to 60 rpm, 0.15 to 0.30 $\times$ $g$) for a period of 1 to 2 minutes. Then, the centrifugal force is increased to about from 10 to 15 $\times$ $g$ for a period of 2 to 3 minutes. The total drying time is generally about 3 to 5 minutes.

If the cooked brown rice is not dried immediately after cooking it must be treated with water at ambient temperature for a period of about 1 to 2 minutes.

The so-prepared quick-cooking brown rice can be rehydrated by cooking it in about 2.5 parts of boiling water (per part of rice) for about 15 minutes or until the rice is tender.

Wild rice is rendered quick-cooking by applying to the rice the following steps:

(a) The wild rice is cooked in water at about 100° C. for a period of 25 to 45 minutes. Usually, about 2 to 4 parts of water per part of rice are employed.

(b) The hot, cooked wild rice is dried immediately in a CFB drier to a moisture content of about 8 to 10%. The temperature of the hot air stream is about 135°–145° C. with a velocity of approximately 600 to 700 meters per minute. It is necessary in the drying of the pre-cooked wild rice to use increasing centrifugal forces for varying time periods. A centrifugal force of about 10 $\times$ $g$ is applied for 1 to 2 minutes followed by approximately 13.6 $\times$ $g$ for 1 to 2 minutes and finally about 17.5 $\times$ $g$ for 1 to 2 minutes for a total drying time of 4 minutes. It is important to note that sequential drying is necessary in order to produce quick-cooking wild rice with acceptable properties upon finish-cooking, such as good appearance, flavor, and texture.

The quick-cooking wild rice can be rehydrated by placing it in about 2.5 parts of boiling water (per part of rice) and allowing the rice to boil for about 15 minutes or until it is tender and ready for consumption.

It should be emphasized that the procedure of the invention must be followed rigorously in order to obtain a product with acceptable texture, flavor, and appearance. Departures from the above-disclosed procedures will yield quick-cooking rice products of inferior quality.

EXAMPLES

The invention is further demonstrated by the following illustrative examples.

EXAMPLE 1

Preparation of Quick-cooking White Rice

A. White rice (long grain, 100 g.) was soaked in 200 ml. of water at ambient temperature for 1 hr. Then, the rice was boiled in 500 ml. of water for 7.5 min. The hot rice was treated with 500 ml. of water at ambient temperature for 1 min.

The so-treated rice was then placed in a CFB drier containing a rotatable basket 14.6 cm. in diameter and 9.4 cm. in width formed from 28 mesh, box weave, stainless steel screen. The basket containing the rice was rotated to tumble the rice at a peripheral speed of 27.5 meters per minute (50 revolutions per min., rpm). A unidirectional flow of air at a temperature of 143° C. and a velocity of 915 meters per min. was passed through the rotating basket. After 2 min. the centrifugal force was increased to 13.5 $\times$ $g$ (400 rpm). After an additional 3 min. the rice was removed from the drier. The moisture content of the so-dried material was 3.4%.

The dried rice was rehydrated by adding 10 g. of rice to 25 ml. of boiling water and holding for 10 min. without additional heating. A panel of judges trained in tasting rice evaluated the product. The quick-cooking long grain rice was rated as having excellent flavor, texture, and appearance.

B. The above procedure was repeated using medium grain white rice in place of long grain with the above exceptions. The soaked rice was boiled in water for 5.0 min. The cooked and cooled rice was dried as above; the moisture content of the final product was 5.0%.

The panel of judges rated the texture, flavor, and appearance of the rehydrated rice as excellent.

C. Short grain white rice was rendered quick-cooking by the process described in Part A with the following exceptions: The soaked rice was boiled in water for 4.0 min. In the drying step the final drying at a centrifugal force of $13.5 \times g$ was for 3 min. The moisture content of the dried rice was 7.0%.

A panel of trained judges evaluated the above product after it was rehydrated as described in Part A. A comparison of the product of the invention with a conventional product, namely, that produced according to U.S. Pat. No. 2,828,209, conventionally known as Minute Rice, indicated that the instant product was equal to or better than the conventional product in appearance, flavor, and texture.

EXAMPLE 2

Preparation of Quick-cooking Wild Rice

The procedure described in Example 1, Part A, was followed except that the one hour soaking step was omitted. A 100 g.-sample of wild rice was boiled in 500 ml. of water for 35 min. The hot, cooked rice was immediately placed in a CFB drier. A unidirectional flow of air at 138° C. and a velocity of 670 meters per min. was passed through the basket, which was rotated to produce a centrifugal force of $10.0 \times g$ (350 rpm). After 1.5 min. the centrifugal force was increased to $13.6 \times g$ (400 rpm) and after an additional 1.5 min. was increased to $17.5 \times g$ (450 rpm). After an additional minute the dried wild rice (moisture content 8.0%) was removed from the drier.

The so-produced wild rice was rehydrated by placing it in boiling water for a period of 15 min. A panel of judges gave an excellent rating to the rehydrated product with respect to its flavor, texture, and appearance.

EXAMPLE 3

Preparation of Quick-cooking Brown Rice

The procedure described in Example 1, Part A, was followed with the following differences. The soaked rice was cooked for a period of 30 minutes. In the drying step cooked rice was tumbled at a peripheral speed of 27.5 meters per minute for 2 min. and then subjected to a centrifugal force of $13.5 \times g$ for 2 min. The moisture content of the final product was 8.0%.

The so-prepared brown rice was rehydrated by placing it in boiling water for a period of 15 min. A panel of judges rated the texture, flavor, and appearance of the rehydrated product as excellent, exhibiting a crunchiness characteristic of cooked brown rice.

Having thus described our invention, we claim:

1. A process for preparing quick-cooking white rice, which comprises
    (a) soaking the rice in water at ambient temperature for a period of 1 hour,
    (b) cooking the soaked rice in water at a temperature of 100° C. for a period of 4 to 8 minutes, and
    (c) drying the cooked rice in a centrifugal fluidized bed drier at a temperature of about 140°–150° C. and an air velocity of about 610–915 meters per minute wherein
        the rice is first treated with hot air while being tumbled at a centrifugal force of about 0.15 to $0.30 \times g$ for a period of about 1-2 minutes and then
        treated with hot air while being tumbled at a centrifugal force of about from $2-30 \times g$ for a period of about 3-6 minutes.

2. The process of claim 1 wherein the cooked rice is treated with water at ambient temperature for a period of about 1-2 minutes prior to drying in Step c.

3. A process for preparing quick-cooking wild rice, which comprises
    (a) cooking the rice in water at a temperature of 100° C. for a period of about 25 to 45 minutes and
    (b) drying the cooked rice in a centrifugal fluidized bed drier at a temperature of about 135°–145° C. and an air velocity of 600–700 meters per minute wherein
        the rice is first treated with hot air while being tumbled at a centrifugal force of about $10 \times g$ for a period of 1 to 2 minutes, then treated with hot air while being tumbled at a centrifugal force of about $13.6 \times g$ for a period of 1 to 2 minutes, and finally treated with hot air while being tumbled at a centrifugal force of about $17.5 \times g$ for a period of 1 to 2 minutes.

4. A process for preparing quick-cooking brown rice, which comprises
    (a) soaking the rice in water at ambient temperature for a period of 1 hour,
    (b) cooking the soaked rice in water at a temperature of 100° C. for a period of 20 to 40 minutes, and
    (c) drying the cooked rice in a centrifugal fluidized bed drier at a temperature of about 140°–150° C. and an air velocity of about 610–915 meters per minute wherein
        the rice is first treated with hot air while being tumbled at a centrifugal force of about 0.15 to $0.30 \times g$ for a period of about 1-2 minutes and then
        treated with hot air while being tumbled at a centrifugal force of about from $10-15 \times g$ for a period of 2-3 minutes.

5. The process of claim 4 wherein the cooked rice is treated with water at ambient temperature for a period of about 1-2 minutes prior to drying in Step c.

* * * * *